United States Patent [19]

Vogel et al.

[11] 4,136,528
[45] Jan. 30, 1979

[54] REFRIGERATION SYSTEM SUBCOOLING CONTROL

[75] Inventors: Kenneth E. Vogel, Mound; Jerome D. Powlas, Minneapolis, both of Minn.

[73] Assignee: McQuay-Perfex Inc., Minneapolis, Minn.

[21] Appl. No.: 759,129

[22] Filed: Jan. 13, 1977

[51] Int. Cl.² .............................................. F25B 45/00
[52] U.S. Cl. .................................... 62/174; 62/196 B; 62/DIG. 17
[58] Field of Search .............. 62/DIG. 17, 174, 196 B, 62/117, 190

[56] References Cited

U.S. PATENT DOCUMENTS

| 3,316,730 | 5/1967 | Lauer | 62/196 B |
| 3,388,558 | 6/1968 | Harnish | 62/196 R |

*Primary Examiner*—William E. Wayner
*Attorney, Agent, or Firm*—Merchant, Gould, Smith, Edell, Welter & Schmidt

[57] ABSTRACT

A control system for a refrigeration system having an air-cooled condenser exposed to normal year round ambient temperatures. Head pressure is controlled in response to sensed subcooling of the refrigerant in the liquid line near the entrance to the expansion device, so as to prevent the occurrence of flash gas at the expansion device, while still allowing minimum head pressures so as to improve energy efficiency. In alternate embodiments, additional controls are provided for assuring at least a predetermined minimum pressure differential across the thermostatic expansion valve. In one preferred embodiment a two-bulb sensing technique is used for subcooling and pressure differential sensing. Both series and parallel condenser-receiver connection systems are disclosed, as are a number of different subcooling sensing and control embodiments.

23 Claims, 8 Drawing Figures

REFRIGERATION SYSTEM SUBCOOLING CONTROL

BACKGROUND OF THE INVENTION

The present invention pertains to the field of controls for cooling systems employing air-cooled condensers exposed to outdoor ambient temperatures. When such systems were intitially developed many years ago, they could not be used for year round outdoor service in colder climates, because the extremely low head pressures developed during the winter months would result in extremely poor efficiency or even complete inoperation of the system. Consequently, a number of different control techniques were developed to raise the head pressure in the condenser when it is exposed to cold ambient air, so as to maintain pressures as high as normally existing during summer months. Some such techniques involve the use of thermostatically controlled fans or dampers on the condenser to decrease its effectiveness during winter months. Another widely used technique is to provide a bypass path around the condenser for hot gas so that it may pass directly from the compressor to a receiver, thereby causing refrigerant to back up into, or flood, a portion of the condenser. In such systems, a control valve controls system pressure against a reference pressure, and controls flooding accordingly. When a portion of the condenser is flooded, the effective area of the condenser is reduced so that higher pressures can be maintained.

Although these types of prior art systems have proved to be generally satisfactory, further improvements are possible in terms of improving the energy efficiency of the system. Increased volumetric efficiency and decreased power consumption could be achieved if the system could be operated at a lower head pressure rather than maintaining summer head pressure year round. As condensing pressure drops, the compression ratio that the compressor operates against decreases. As the compression ratio decreases, the volumetric efficiency of the compressor increases. Volumetric efficiency is defined as how much a compressor actually pumps as compared to how much it would pump if there were no re-expansion or other losses. As the volumetric efficiency increases, the refrigerating effect increases in direct proportion. Also, as condensing pressure is lowered, the power consumption of the compressor generally declines. The theoretical net effect then, of operating at lower head pressures is an increase in refrigerating effect, accompanied in most cases by a decrease in power consumption by the compressor.

Unfortunately, a number of unwanted factors affecting system performance begin to show up at lower head pressures which, if uncontrolled, can disrupt system operation and cancel out the theoretic advantages of operating at low head pressures as discussed above. Of these factors, the formation of flash gas entering the expansion device, is the most serious. In most systems, the expansion device, often a thermostatic expansion valve, has a port designed to operate with liquid phase refrigerant. The presence of vapor bubbles or flash gas in the liquid refrigerant delivered to the expansion device can greatly disrupt its operation by in effect clogging the orifice and reducing its flow capacity.

It has been found that a number of more or less independent factors contribute to the formation of flash gas in the liquid line, and not all of these factors are predictable or easily controllable. As a result, prior art systems have had to set the reference pressure for their condenser flooding or other pressure control system high enough to avoid flash gas formation during the worst case combination of these factors. The result is that when the factors which contribute to flash gas formation are at less than a worst case condition, which might be 90% of the time, the system is operating at a higher pressure than necessary, resulting in operation at less than optimum efficiency.

A number of the factors which contribute to the formation of flash gas in the liquid line are as follows. The length of the liquid line may be a prime contributor. In many installations such as supermarkets, the condensers for cool space such as display cases or meat lockers may be operated a great distance away, for example on the roof of a building. The liquid line may run across a part of the roof, through a distance inside the comfort conditioned space of the building, and in some cases even through a non-air-conditioned equipment area. In addition to the pressure drop due to fluid resistance in the long fluid line, the long run provides an increased area for possible heat pick up when passing through areas at higher temperature than the liquid, or when exposed to the sun on the roof. Another problem results when the evaporator is positioned above the condensing unit, resulting in loss of liquid line pressure due to the static head. Also, either oversized or undersized liquid lines can contribute to flash gas generation. If the liquid lines are undersized, excessive fluid pressure drop is introduced because the liquid has to travel at a higher velocity to achieve the desired flow rate. On the other hand, if the liquid lines are oversized, they present an increased area or surface for heat transfer into the liquid line from higher ambient temperatures. Further, the reduced velocity of teh refrigerant within the oversized liquid line results in correspondingly greater time during which the refrigerant is exposed to the unwanted heat transfer.

It is common to provide subcooling to the refrigerant after it leaves the condenser and receiver. This is accomplished by routing the liquid line from the receiver through a number of coils mounted with the condenser. Since the refrigerant in the receiver normally is at saturation temperature and pressure, the subcooler will bring the refrigerant a few degrees below saturation temperature at that pressure, so as to provide a reserve or margin against the formation of gas bubbles. However, the temperature increases due to heat pickup mentioned above and pressure drops as mentioned above both tend to reduce or eliminate the subcooling margin by the time the refrigerant reaches the evaporator, so that the addition of a subcooler alone does not fully solve the flash gas problem.

Another type of prior art system attempts to solve this problem by passing the liquid line through a heat exchanger between the liquid line input to the evaporator and the gas line output from the evaporator. However heat exchangers rely on the entering liquid being warmer than the entering gas. This relationship cannot always be maintained during winter operation, and when it is not maintained, the heat exchanger is a liability, sending liquid to the compressor and flash gas to the expansion valve.

SUMMARY OF THE INVENTION

The present invention provides an improved control system for a refrigeration system of the type including a compressor, a condenser, an expansion device, and an evaporator interconnected to form a flow path for a refrigerant charge. Means are provided for sensing the subcooling of the liquid line at the entrance to the expansion device or at such other point that will assure subcooling at the expansion device. Further means are provided for controlling the system head pressure in response to the sensed subcooling. The control system of the present invention controls system head pressure so as to prevent flash gas in the liquid line presented to the expansion device. The system achieves high efficiency of operation by increasing pressure head only to the minimum amount necessary to ensure freedom from flash gas.

In a preferred embodiment, system head pressure is controlled by means for controlling condenser flooding, including a control valve for controlling condenser bypass.

According to another aspect of the invention, the subcooling sensing means may comprise a force balance device which compares fluid pressure in the liquid line against the equivalent saturation pressure corresponding to the temperature of the liquid line. The force balance device may be included in the control valve. Alternatively, one preferred embodiment uses a force balance device to operate an electrical switch connected to a heat motor. The heat motor in turn generates control pressures to operate the control valve.

According to another aspect of the present invention, means may be provided for sensing pressure differential across the expansion device, and for further controlling head pressure in response thereto so as to maintain at least a predetermined mimimum pressure differential. In one preferred embodiment, the pressure differential sensing means includes a second force balancing device connected together with the subcooling sensing force balance device for controlling the heat motor.

According to another aspect of the invention, subcooling, and expansion device differential pressure are jointly sensed by a two-bulb sensing system including one bulb in thermal contact with the liquid line, and the other bulb having a thermal relationship to the air in the refrigerated space. The two bulb system connects to a force balancing device which also receives an input representing liquid line pressure, and means are provided for controlling the control valve in response to the force balance device.

According to another aspect of the invention, the condenser and condenser bypass path may be connected by the control valve to a receiver. In another embodiment, the condenser and receiver are connected in parallel, with the control valve controlling their outputs.

DETAILED DESCRIPTION OF THE PREFERRED EMBODIMENTS

Figure 1:
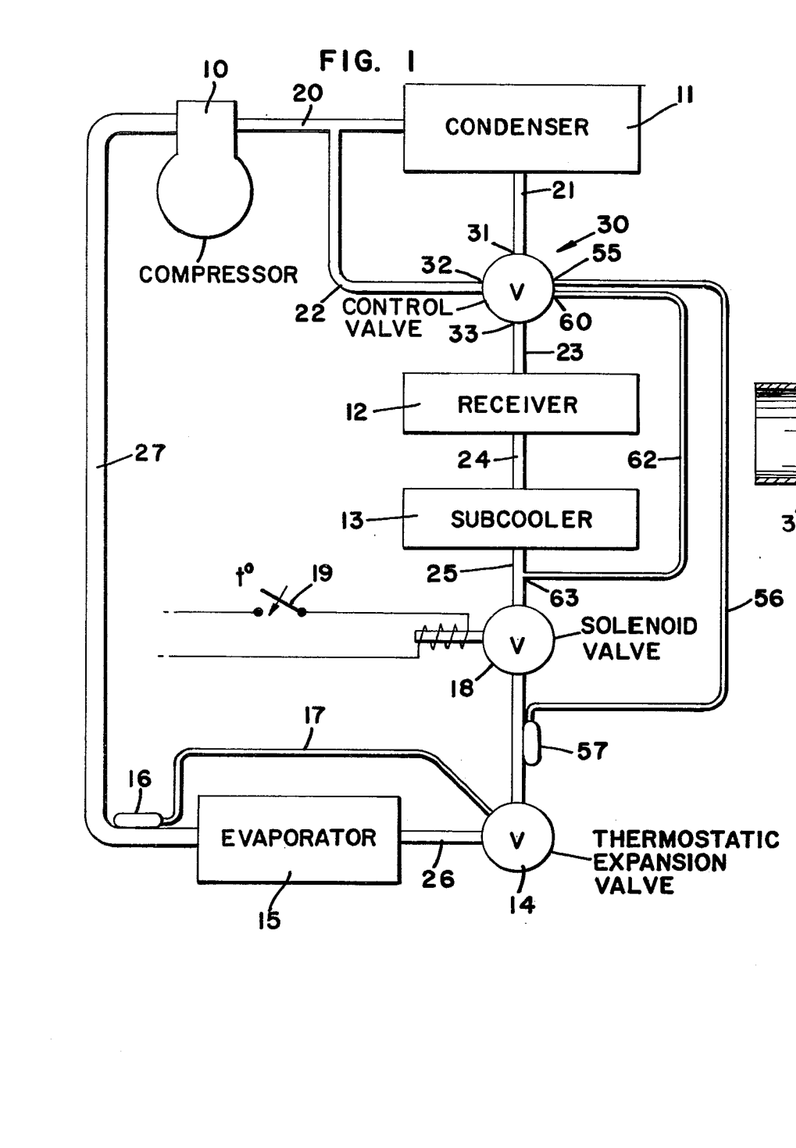
FIG. 1 is a schematic diagram of a refrigeration system utilizing the present invention.

In FIG. 1 there is shwon a refrigeration system employing one embodiment of the improved control system according to the present invention. The system in FIG. 1 includes a motor driven compressor 10, a condenser 11, a receiver 12, a subcooler 13, a thermostatic expansion valve (TEV) 14, or other expansion device, and an evaporator 15.

These components are connected as follows. The outlet or high pressure side of compressor 10 connects via a conduit 20 to the input of condenser 11. The output of condenser 11 connects via a conduit 21 to a first inlet port 31 of a control valve 30. A bypass conduit 22 branches from conduit 20 and connects to an inlet 32 of control valve 30. An outlet port 33 of control valve 30 is connected to the input of receiver 12 by means of a conduit 23. The outlet of receiver 12 connects to the inlet of subcooler 13 by means of conduit 24.

The cooled refrigerant from the outlet of subcooler 13 is conveyed by means of a conduit or liquid line 25 to TEV 14. The TEV is closely connected by means of distributor or conduit 26 to the evaporator 15, and the outlet of evaporator 15 is connected by means of a vapor line 27 back to the input or low pressure side of compressor 10. Sensing bulb 16 is placed in thermal contact with the output of evaporator 15, and connects by means of a conventional capillary 17 to control the TEV.

The compressor, condensor, receiver, subcooler, TEV and evaporator are conventional components as known in the prior art, and operate generally as follows. Compressor 10 draws in low pressure vapor from the outlet of the evaporator, and compresses it into high pressure vapor in conduit 20. Condenser 11, which may be a conventional tube and fin condenser, with or without auxiliary fan, dissipates heat and condenses the high pressure vapor into liquid refrigerant. The liquid from condenser 11 eventually passes to receiver 12, disregarding for the moment the action of control valve 30 and bypass 22 which is explained more fully hereinafter. Receiver 12 provides a storage reservoir for the refrigerant and helps to separate liquid refrigerant from any remaining vapor. The outlet of the receiver is below liquid level so that vapor is normally stopped at the receiver.

Subcooler 13 may for convenience be an additional tube and fin circuit mounted with condenser 11 as part of the same assembly, although the fluid paths therethrough are kept separate. Alternatively, subcooler 13 may be a separate heat radiating device. Subcooler 13 functions to reduce the temperature of the liquid below the saturation temperature at the given head pressure.

Thermostatic expansion valve 14 operates in the conventional manner in conjunction with sensing bulb 16 to regulate the flow of refrigerant therethrough so as to maintain a predetermined amount of superheat at the outlet of the evaporator.

Liquid line 25 runs from the outlet of subcooler 13 to TEV 14. As previously explained, this liquid line may be required to traverse a great deal of distance, including possible vertical elevation changes, in running from the condenser and associated components which may be mounted remotely from the evaporator. It is primarily in liquid line 25 that unwanted pressure drops and heat pick up may occur so a as to threaten to eliminate the subcooling and cause flash gas to be presented to the TEV.

Although not essential to the present invention, a conventional thermostatic control can be provided for the sytem as follows. A thermostat 19 is positioned in the refrigerated space, and it is electrically connected to a solenoid operated pump down valve 18 which is connected at some point in liquid line 25. When the refrigerated space is cool enough, thermostat 19 opens, deenergizing the solenoid to close valve 18. Compressor 10 then pumps the remaining refrigerant from evaporator 15. When a sufficiently low pressure is reached in vapor line 27, compressor 10 is shut down by a pressure sensing switch (not shown). When thermostat 19 senses a rise of temperature in the refrigerated space, the thermostat closes, opening pump down valve 18, and the flow of refrigerant resumes. Compressor 10 starts again when the pressure in vapor line 27 begins to rise.

In order to prevent loss of subcooling and the introduction of vapor bubbles in liquid line 25 the present invention controls the operation of the system in response to a measurement of the amount of subcooling at a point along liquid line 25 ahead of TEV 14 that will assure a vapor free condition at the input of the TEV. This measurement of subcooling can be made at the end of liquid line 25 adjacent to the input to the TEV, or at such other point along the liquid line 25 as may be appropriate, as discussed more fully hereinafter.

The measurement of subcooling can be performed by suitable measurements of pressure and temperature of the liquid in line 25. Once these measurements are made, they can be compared to the characteristic saturation temperature at the measured pressure for the particular refrigerant involved. Any convenient means can be used for making the subcooling measurement. For example, any type of fluid, mechanical or electrical sensor can be used. The control means for controlling valve 30 would then be implemented in terms of mechanical or electrical controls compatible with the sensors.

In the preferred embodiment of FIG. 1, subcooling sensing is accomplished by fluid pressure techniques, and control is achieved by controlling condenser flooding in response to subcooling. However, it will be appreciated that other control techniques for controlling head pressure or subcooling could be used according to the present invention.

Figure 2:
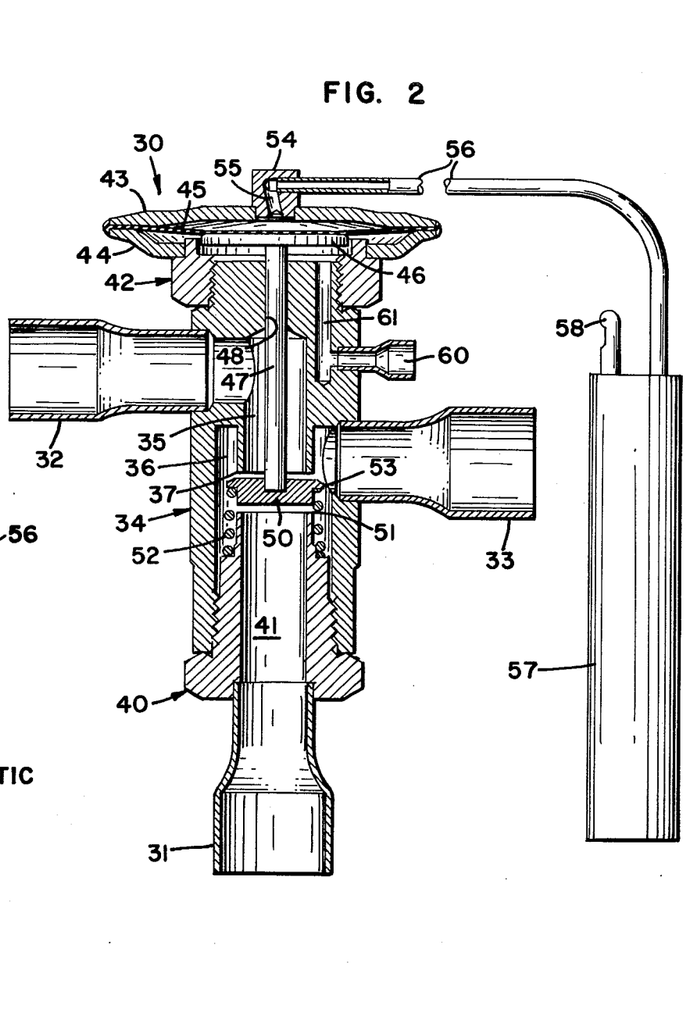
FIG. 2 is an axial section of a control valve for use in the system of FIG. 1.

With reference to FIG. 2, control valve 30 includes a valve housing 34 having an opening or chamber 35 formed therein. An inlet port 32 communicates with chamber 35 which may be an axial bore. A larger axial bore comprises a mixing chamber 36 as explained hereinafter. An annular portion or seat 37 is formed around the extension of chamber 35 into mixing chamber 36.

A second body portion 40 is threadably received into the lower extension of mixing chamber 36. Body portion 40 contains an axial bore 41 which opens into mixing chamber 36 and is aligned opposite chamber 35. An annular seat 51 is formed around the extension of bore 41 into chamber 36. The lower end of bore 41 connects through inlet port 31 for connection to the other conduits of the system. The outlet port 33 is in fluid communication with mixing chamber 36.

At the opposite end of body 34, a cap portion 42 is threadably received thereon. Cap 42 supports upper and lower diaphragm housings 43 and 44 respectively which are sandwiched together to enclose a diaphragm member 45. A disk 46 is attached to or positioned adjacent the central portion of the lower side of diaphragm 45, and a push rod 47 connected to disk 46 extends downwardly through an axial bore 48, through chamber 35 into mixing chamber 36. A valve disc 50 is attached to the end of push rod 47 and is positioned in mixing chamber 36 in alignment with seat 37 and seat 51. A coil spring 52 is coaxially mounted around the seat 51 and a portion of valve disc 50, where it engages a flange portion 53 of disk 50. Spring 52 is a follower spring for normally urging valve disk 50 upwardly against the end of push rod 47. Additionally when push rod 47 is in its upward position in response to the net pressure on diaphragm 45, spring 50 serves to maintain valve disc 50 closed against valve seat 37, against the pressure differential between inlet ports 32 and 31 caused by normal pressure drops in the condenser.

At the top of diaphragm housing 43 is a plug 54 which includes a fluid passage 55 which is in fluid communication with the volume between diaphragm housing 43 and diaphragm 45. Passageway 55 connects by means of a fluid tube 56 to a sensing bulb 57. Tube 56 and sensing bulb 57 contain a predetermined charge of refrigerant for operating the control valve as explained hereinafter. Tube 58 may be used during the manufacturing process for introducing the charge of refrigerant, after which time tube 58 is clamped or sealed off.

The volume beneath diaphragm 45, above cap 42 and diaphragm housing 44 is internally connected to pressure port 60 by means of a fluid passageway 61. It will be understood that sealing means are included between push rod 47 and bore 48 so that the fluid in the chamber beneath diaphragm 45 is isolated from fluid in chamber 35.

Referring again to FIG. 1, a conduit or tube 62 connects from port 60 of control valve 30 to a pressure tap 63 in liquid line 25. Bulb 57 is clamped or otherwise fixed in close thermal contact with liquid line 25 at an appropriate point near the TEV. Although FIG. 1 shows pressure tap 63 on the upstream side of pumpdown valve 18, it will be appreciated that pressure tap 63 may be placed at any desired position along liquid line 25. For example, pressure tap 63 may be placed closely adjacent sensing bulb 57, so that the pressure and temperature sensing are done at substantially the same point.

Alternatively, pressure tap 63 can be placed at any other position along liquid line 25 if the pressure differences between the point at which pressure tap 63 is placed and the point at which bulb 57 is placed are taken into account. These pressure differences are due to changes in elevation, or due to fluid pressure drops because of movement of the fluid through the conduit. The pressure difference between the location of tap 63 and the location of bulb 57 can be determined by experiment or calculation so as to provide the desired effective control. For example, differences in pressure tap location can be corrected by suitable selection of a bias to valve 30.

Super-heated gas from the compressor and subcooled liquid from the condenser are mixed or otherwise controlled in control valve 30 depending on the position of valve disk 50, and the mixture is passed to a receiver. The position of valve disk 50 in turn is controlled by the net sum of the forces on diaphragm 45. Bulb 57 is basically charged with the same refrigerant as that in the system, so that the temperature of the liquid line is converted into an equivalent saturation pressure. This saturation pressure is applied to the top of diaphragm 45, and the actual pressure in liquid line 25 is applied to the bottom. If the pressures are equal, the liquid line contains saturated refrigerant. If the liquid pressure is greater, liquid line 25 contains subcooled refrigerant.

In practice, in order to shift the balance point and provide a more useful output, a bias is applied. The bias may be applied by the addition of a non-condensible gas in bulb 57 to provide an additional partial pressure. Alternatively, the bias could be provided by a spring between housing 43 and diaphragm 45 urging valve disk 50 towards seat 51. Also, the spring could be used with the gas bias by suitable selection of parameters. These biasing means are adjusted so as to provide any desired offset for operating the system at any desired minimum subcooling point.

When the sensed temperature and pressure are such that the degree of subcooling needs to be changed, the change is effected by changing the flooding of the condenser. For example, when more subcooling is needed, valve disk 50 tends to close off the inlet from the condenser, reducing flow therethrough. This allows an increasing amount of hot gas from the compressor to flow into the receiver. A volume of gas introduced into the receiver displaces a much greater mass of liquid refrigerant from the receiver. Since the variation in the quantity of refrigerant in the single phase parts of the system is normally very small, and since the quantity of refrigerant in the evaporator varies as a function of the heat load which can be assumed to be almost constant for a given design load, the refrigerant displaced from the receiver eventually ends up in the condenser. The length of the tubing in the condenser filled with liquid refrigerant is increased, and the length of the path of the two phase region is reduced. This has the effect of changing the temperature difference between the outside cooling air and the condensing refrigerant in the aircooled condenser.

Errors in subcooling at the TEV inlet are sensed and reflected as unbalanced pressures in control valve 30, which cause the valve disk 50 to move and the mixture at the valve outlet 33 to change. If more liquid flows out of the receiver 12 than flows in, the receiver will lose charge, and this charge will appear in the condenser 11 causing increased flooding and higher condensing temperatures and pressures. The higher pressure in the condenser causes higher pressure in the high pressure side of the system, and thus the correction is fed back through pressure tap 63 to the underside of diaphragm 45 causing the valve to rebalance. In this manner, this system operates with only slight variations in subcooling dispite wide variations in heat gain and pressure drop through the liquid line.

A variation on the system of FIGS. 1 and 2 would involve deleting pressure tap 63 and tube 62, and instead extending fluid passage 61 of valve 30 downwardly to connect with outlet port 33. Pressure port 60 would be capped off. This would have the effect of taking the reference pressure measurement for the liquid line at the outlet of the mixing valve. System design including bias selection for the control valve should then take into account the expected pressure drop between outlet 33 and the entrance to the thermostatic expansion valve.

Figure 3:
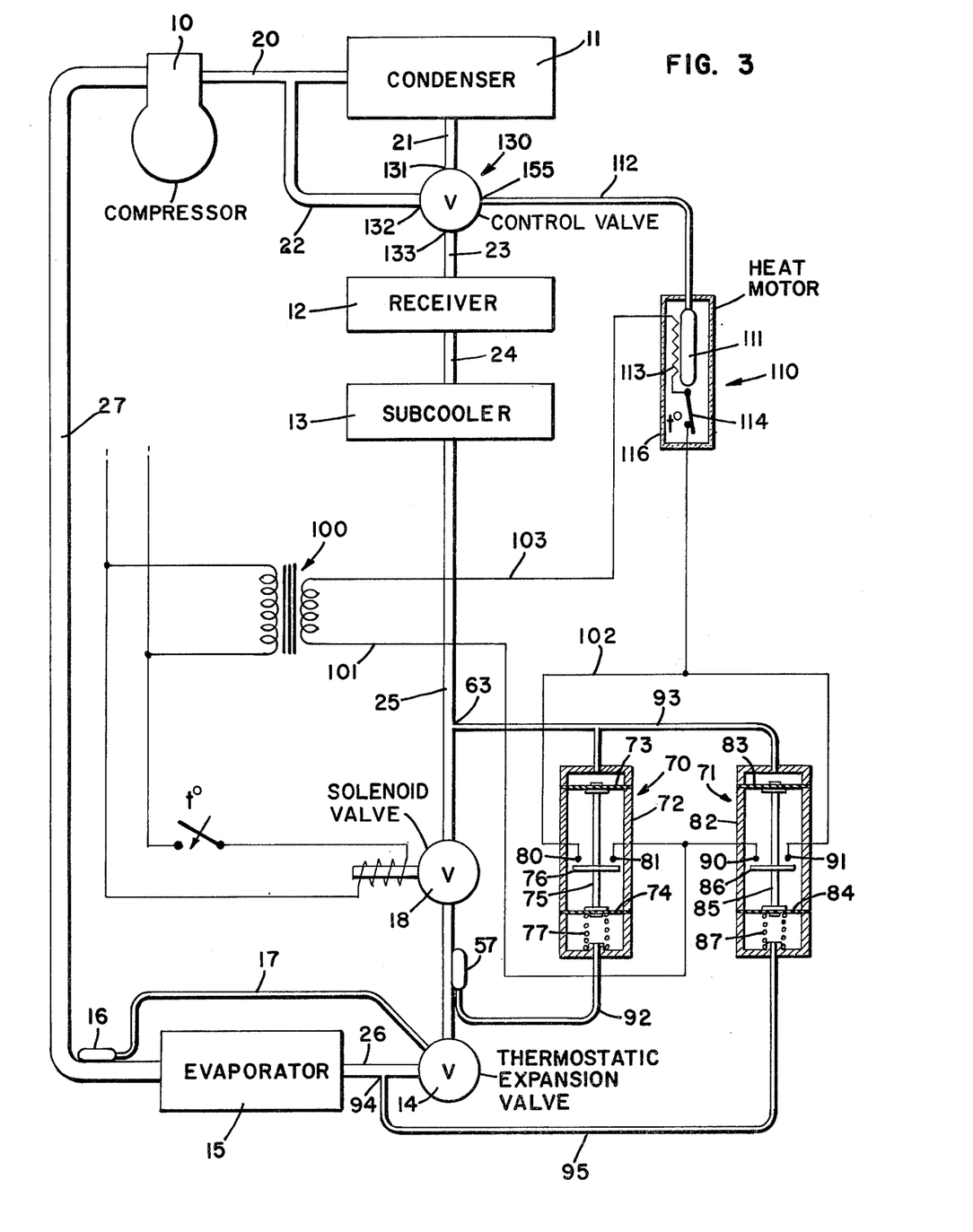
FIG. 3 is a schematic diagram of a refrigeration system using an alternate embodiment of the present invention.
Figures 4, 5:
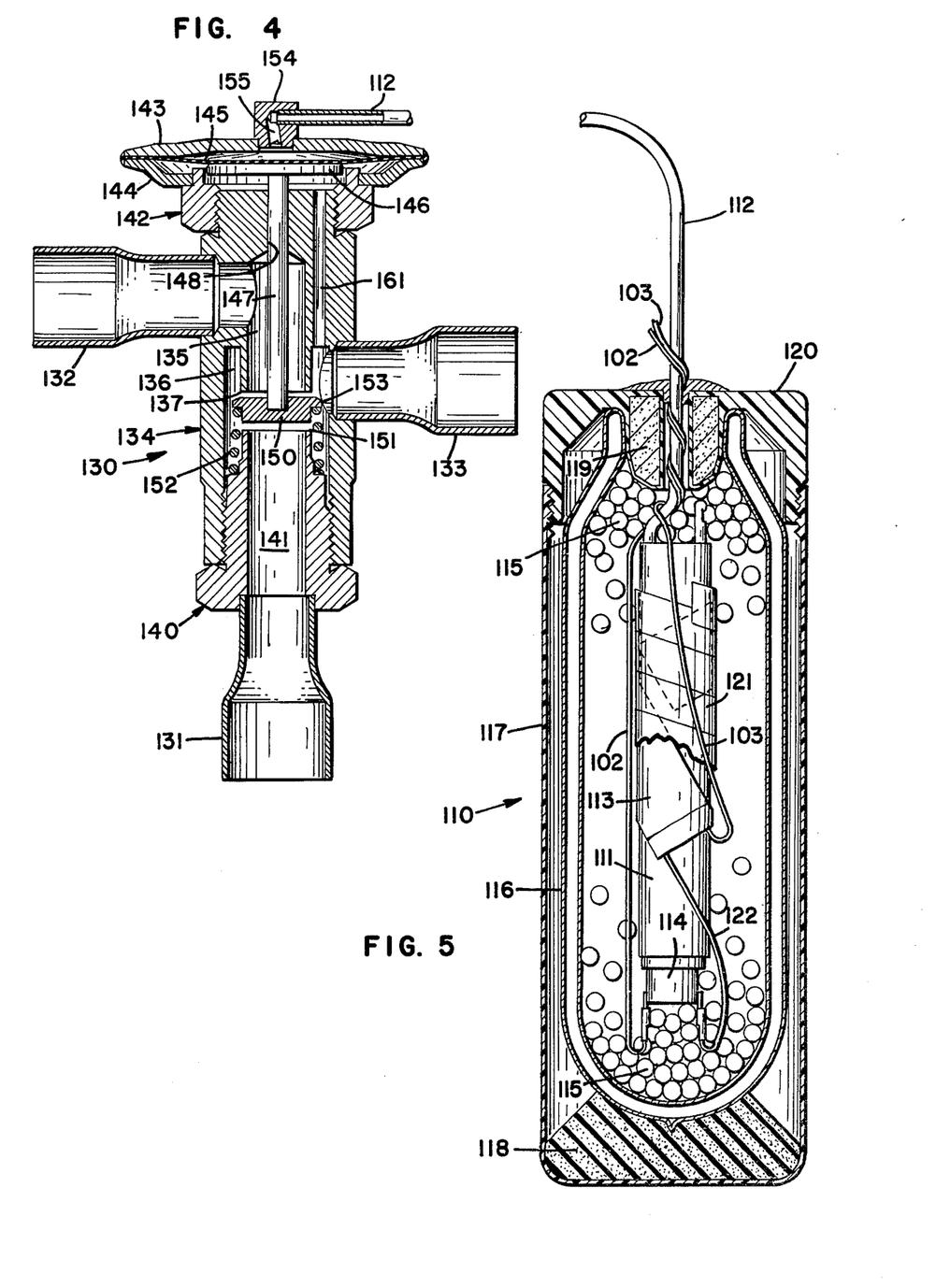
FIG. 4 is an axial section of a control valve for use in the system of FIG. 3.
FIG. 5 is an axial section of the heat motor of the system of FIG. 3.

An alternative embodiment of a refrigeration system according to the present invention is shown in FIG. 3, in which like components are given the same reference numbers as in FIG. 1. The basic system components including compressor 10, condenser 11, receiver 12, subcooler 13, pump-down valve 18, TEV 14, and evaporator 15 are the same as in FIG. 1. Control valve 130, shown more clearly in FIG. 4, is used in place of control valve 30 of FIG. 1. Additionally, a different implementation of the subcooling control is used. In FIG. 3, a pair of differential pressure switches 70 and 71 are used. Pressure switch 70 includes a housing 72, a first diaphragm 73 and a second diaphragm 74. A push rod 75 is positioned between the two diphragms, and it carries an electrical contact 76. A bias spring 77 urges upwardly on diaphragm 74 and the push rod 75. A pair of electrical contacts 80 and 81 connect through wires in the casing and are positioned for connection by contact 76 when the push rod moves upwardly.

Differential pressure switch assembly 71 has like elements 82–87 and 90, 91.

Temperature sensing bulb 57 connects via conduit 92 to the inside of housing 70 beneath diaphragm 74. Pressure tap 63 connects via tubing 93 to the inside of housing 72 above diaphragm 73. A force balance is thus established with the pressure from bulb 57 plus spring bias 77 opposing the pressure in the liquid line as sensed at tap 63. Differential pressure sensing device 71 similarly measures a force balance between the pressure in liquid line 25 and the pressure in distributor 26 as applied to device 71 by pressure tap 94 and tube 95.

Electrical power from a transformer 100 or other suitable source of power connects by means of an electrical lead 101 to contacts 81 and 90. Contacts 91 and 80 connect by a lead 102 to heat motor 110. Lead 103 from transformer 100 also connects to heat motor 110.

Control valve 130 and heat motor 110 for use in the embodiment of FIG. 3 are shown more clearly in FIGS. 4 and 5. In FIG. 4, the basic control valve is similar in most respects to control valve 30 of FIG. 2, and corresponding parts are correspondingly numbered with a 100 prefix for the part in FIG. 4. The principal difference is that valve 130 lacks pressure port 60, and instead, internal passageway 61 is extended by internal drilling to provide passageway 161 for fluid inter-communication between outlet port 133 and the lower side of diaphragm 145.

Heat motor 110 basically comprises a refrigerant bulb 111 wrapped for heating by an electrical heating element 113, inside a thermally insulated housing. Bulb 111 connects by means of a capillary tube 112 to pressure cap 154 of control valve 130. An electrical heating element, in the form of a heating tape 113 is wrapped tightly around bulb 111 and secured thereto by aluminum tape 121. Heating tape 113 connects through a thermostat 114 which is glued to bulb 111. Electrical leads 102 and 103 connect to the thermostat 114 and to the heating element 113, respectively. Lead 122 completes the circuit from thermostat 114 to heating element 113.

Bulb 111 is surrounded by an insulation material such as styrofoam beads 115, and is placed inside a double-walled vacuum insulated vessel 116. Vessel 116 in turn is positioned inside a housing 117 where it is supported by pad 118 and plug 119 of the cap portion 120.

Bulb 111 of the heat motor may be charged with the same refrigerant as the main system, or it may be charged with a working fluid having a lower vapor pressure curve than the main system.

It will be understood that although a particular form of construction and insulation is indicated in FIG. 5, other suitable types of insulation means for the heat motor can be provided.

FIG. 3 shows the heat motor more schematically, with bulb 111 in thermal contact with heater 113 and surrounded by insulation material.

Differential pressure switch 70 senses subcooling, with spring 77 and an optional partial pressure of non-condensible gas in bulb 57 providing bias for the design offset point as before. Switch contact 76 closes when the subcooling falls below the preset value. This completes the circuit to heat motor 110, which raises the temperature and pressure in bulb 111. Thermostat 114 protects the heat motor from overheating. This pressure causes a force on diaphragm 145 which is opposed by a force on the other side of the diaphragm caused by the valve outlet pressure at port 133, which is essentially the receiver pressure. Any unbalanced force on the diaphragm moves the valve disk as in the previous example, until the spring force balances it. The repositioning of valve disk 150 causes flooding or unflooding of the condenser and changes in the subcooling, as with the embodiment of FIG. 1.

With the heat motor turned off, the pressure in bulb 111 will fall asymptotically to the saturation pressure corresponding to the ambient temperature. As it falls, the valve outlet pressure will fall to a saturation pressure corresponding to a normal condensing temperature above ambient temperature. In this manner, the pressures in opposition on the diaphragm are related to the condensing ambient temperature and a small closing force is always available to stop hot gas bypass. With this system, there is no fixed relationship between bulb temperature and disk position. The disk position is related instead to the difference between bulb temperature and condensing temperature.

The purpose of differential pressure switching device 71 and its associated components is to control head pressure so as to ensure that at least a predetermined minimum pressure differential is maintained across the TEV port for proper operation. However, expansion device pressure differential control is not necessary for the present invention, and may be deleted in those applications in which it can be determined that condensing pressure will not fall too close to the evaporating pressure. In those applications in which it may be expected that condensing pressure might fall too close to the evaporating pressure, then differential pressure switch 71 and associated component should be included to prevent a situation from occuring where there is adequate subcooling, but not adequate pressure differential across the TEV port for proper operation.

In operation, pressure differential switching device 71 is wired in parallel with switching device 70, so that heat motor 110 will respond to either the subcooling control or the differential pressure control, whichever is activated first.

Figure 6:
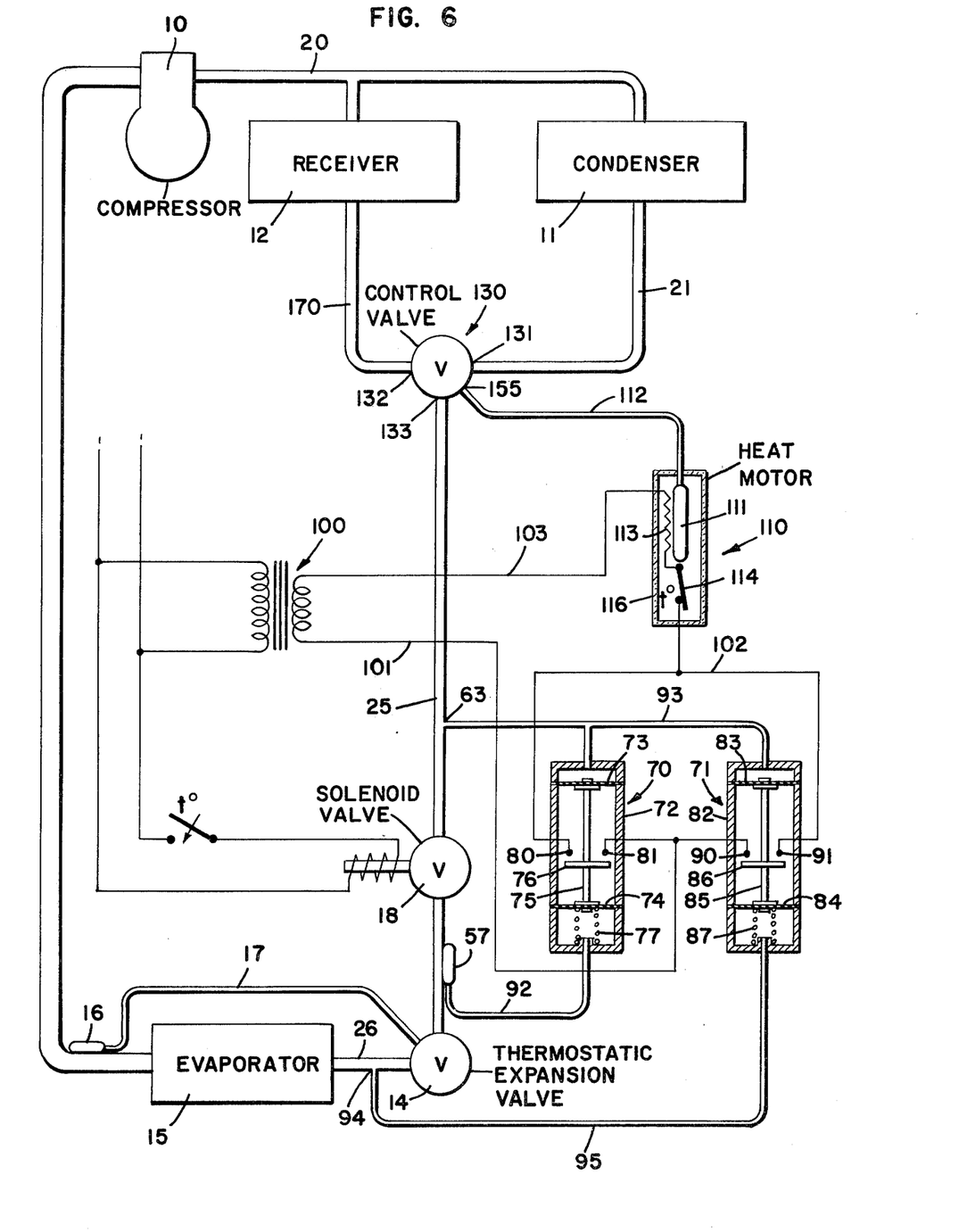
FIG. 6 is a schematic diagram of an alternate embodiment of the system of FIG. 3.

The embodiment of FIG. 6 is similar in most respects to the embodiment of FIG. 3, and corresponding parts are correspondingly numbered. Specifically, control valve 130 may be the same as in FIGS. 3 and 4, differential pressure sensing switches 70 and 71 are the same as in the embodiment of FIG. 3, and heat motor 110 may be the same as in the previous embodiment. The primary difference between the embodiments of FIGS. 3 and 6 is that in FIG. 6, condenser 11 and receiver 12 are effectively connected in parallel by branching conduit 20, and there is no bypass conduit 22 and no subcooler 13. The outlets of condenser 11 and receiver 12 are connected to the three-way valve 130, with the receiver outlet connecting by means of a conduit 170 to inlet port 132 and the outlet of condenser 11 connected through conduit 21 to inlet port 131 of control valve 130. The two streams from receiver and condenser are mixed and passed through outlet 133 to the liquid line 25 and the rest of the system.

Control valve 130 is controlled by heat motor 110 and the differential pressure switches as in the embodiment of FIG. 3. The system of FIG. 6 utilizes the tendency of the receiver to act as a poor condenser to slowly condense gas to liquid. When control valve 130 is in a position to shut off the outlet from receiver 12, the receiver slowly accumulates a charge from the system. This has the effect of slowly unflooding the condenser and reducing the subcooling. When either subcooling pressure differential switch 70 or TEV differential pressure sensing switch 71 calls for an increase in subcooling or system pressure, the heat motor is energized. This causes the valve disk 150 of the control valve to shift, causing an increase in resistance to flow through the path from the condenser, and a decrease in resistance to flow through the path from the receiver. When the mass flow rate out of the receiver exceeds the rate at which gas condenses to liquid in the receiver, the receiver begins to empty and the condenser begins to flood. Condenser flooding increases the condensing pressure, which causes a feedback and repositions the disc. By using the control valve to pass liquid only, a smaller valve port can control a much larger system. As the subcooling increases in the system, the heat motor will be de-energized, and the temperature therein will slowly decay towards ambient until the cycle is repeated.

As in the case of the embodiment of FIG. 3, differential pressure sensing switch 71 and associated components can be deleted from the embodiment of FIG. 6, under certain circumstances as previously explained.

Figure 7:
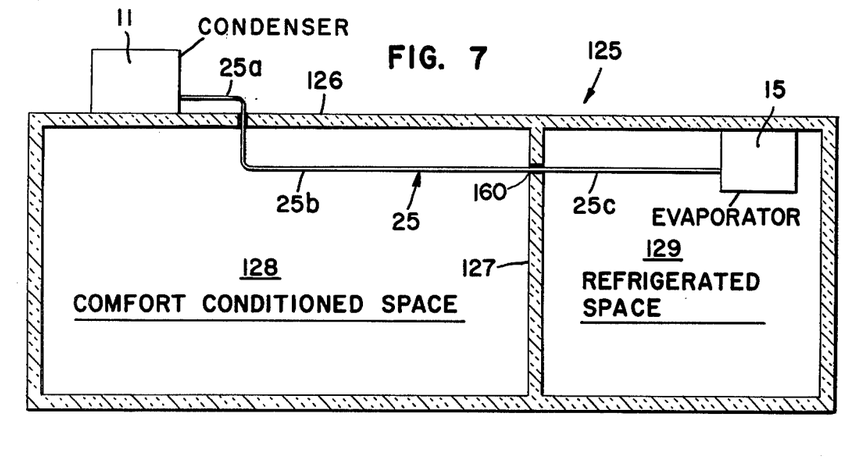
FIG. 7 is a diagram illustrating relative placement of components of the refrigeration system in a typical installation.

Factors relating to the location of the subcooling sensing will be explained with reference to FIG. 7. In FIG. 7, reference number 125 generally designates a building containing a refrigeration system. By way of example, building 125 might be a supermarket. Condenser 11 and associated components are mounted on the roof 126 of the building 125. Inside the building is a comfort conditioned space 128 which is assumed to be maintained at near 70° F. year round. A refrigerated space 129 is formed within building 125, and separated from the comfort condition space 128 by means of an interior wall, cabinet, or the like designated by reference number 127. Refrigerated space 129 might represent a meat locker, or a refrigerated display case in the supermarket. Evaporator 15 is positioned in the refrigerated space for maintaining a cool temperature therein, for example, 35° F. Liquid line 25 is shown in FIG. 7, and extends from condenser 11 to evaporator 15, along a portion of the roof and through the building. The portion of liquid line 25 from the condenser (or subcooler) to where it passes through an opening in roof 126 is indicated by reference 25a. The zone or portion of the liquid line passing through comfort conditioned space 128 is indicated by reference number 25b. The portion of liquid line 25 from the point at which the line passes through wall cabinet 127 to evaporator 15 is indicated by reference 25c.

It is desirable to control subcooling from the warmest point on liquid line 25 to prevent flash gas formation anywhere in the liquid path. However, in some types of installations, the warmest point in the liquid line is not always predictable. With reference to FIG. 7, in typical summertime operation, the outdoor temperature might be 90° F. The temperature of the liquid leaving the condenser or subcooler is even warmer, and as the liquid flows through the lines, it always flows through progressively colder spaces so that its temperature is always equal to or higher than its surroundings. Thus, the liquid line will be giving up heat in each of zones 25a, 25b, and 25c, and the liquid will become increasingly subcooled, barring any irregular pressure drop. The warmest point on the liquid line in this summertime example is at the condensing unit and no head pressure control is normally required.

Assume now that the outdoor temperature is 50° F. such as might occur during spring or fall. The liquid line continues to lose heat in zone 25a, but will enter the comfort conditioned spaced at nearly outdoor ambient temperature, and will gain heat while passing through zone 25b. The liquid will then lose heat further while passing through zone 25c. Thus in this example, the point of highest temperature will be at the entrance to the refrigerated space, indicated by reference number 160.

As a third example, assume that the outdoor temperature is minus 20° F., which might be encountered in winter conditions. The liquid will enter the comfort conditioned space 128 at perhaps minus 15° F. If zone 25b of the liquid line run is not adequately insulated, or if it is too long, the liquid may gain enough heat so as to reach the refrigerated space above the refrigerated space temperature. If this occurs, the liquid will lose heat in zone 25c, and the warmest spot will be at point 160. However, if zone 25b through the comfort conditioned space is short enough, or the initial liquid temperature cold enough, the liquid may enter the refrigerated space in zone 25c colder than the refrigerated space and gain heat and temperature as it goes to the TEV.

By considering these examples, it can be seen that the outdoor air temperature variation can cause the warmest point on the liquid line to move different locations at different times, making it difficult or impossible to always control from the warmest point. However, the subcooling sensing can be positioned to assure adequate subcooling at the entrance to the TEV as follows.

The simplest method is to mount the liquid line temperature sensing bulb 57 (or other temperature sensing device) at the entrance to the TEV. Assuming normal system operation, this will assure that liquid reaches the TEV in a bubble free condition for good operation. It is still possible that bubbles might be formed in the liquid line at an earlier warmer point in the line but would recondense by the time they have reached the subcooling sensing at the TEV. This situation would cause only a slight pressure drop and only a slight loss of efficiency.

If it can be assumed that the refrigerated space will always be colder than the entering liquid in the liquid line 25, then the subcooling temperature sensor can be mounted at the entrance to the refrigerated space. Whether in a given application this assumption is warranted depends upon a consideration of the climate, building layout, and all other pertinent design factors. If so, the sensor will be at the warmest point and optimum efficiency can be obtained. Of course, it will be appreciated that during summertime conditions, the warmest point will be at the condenser, but in such conditions subcooling is assured anyway and head control is not required.

If for a given installation it is not possible to make the assumption that the refrigerated space will always be colder than the liquid line, then one of the alternate embodiments of the control system disclosed herein using the minimum pressure differential control for the TEV in addition to the subcooling control can be used. The minimum differential pressure control, when properly designed, will automatically ensure that subcooling is maintained for the example in which the liquid line continues to gain heat as it passes through the refrigerated space. This is illustrated further by considering the two bulb embodiment of FIG. 8.

Figure 8:
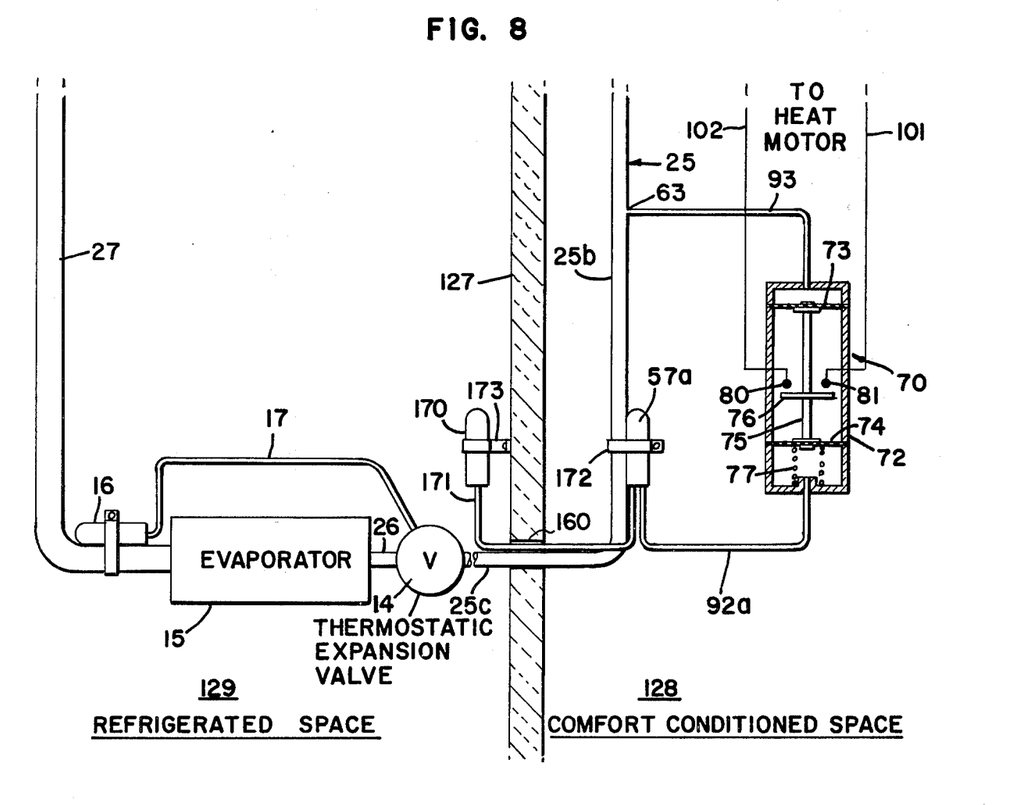
FIG. 8 is a schematic diagram illustrating the two bulb sensing embodiment of the present invention.

FIG. 8 shows a variation of the control system of either FIG. 3 or 6. The compressor, receiver, control valve 130, heat motor 110, and other components are not shown in FIG. 8, but it is understood that these components would be connected as in FIG. 3 or 6 depending upon which embodiment is used. In FIG. 8, liquid line 25 extends through an opening in a wall 127 dividing the comfort conditioned space and the refrigerated space, to connect to thermostatic expansion valve 14. Tube 93 runs from pressure tap 63 in liquid line 25 to the chamber above diaphram 73 of switching device 70, which is identical to switching device 70 of either FIG. 3 or 6.

The chamber at the opposite end beneath diaphragm 74 connects through tube 92a to bulb 57a which is secured by clamp 172 or any other suitable means in close thermal contact with liquid line 25 near the entrance to the refrigerated space. Another tube 171 connects from bulb 57a and extends through the opening in wall 127 to a second bulb 170. Bulb 170 is exposed to the cooled air inside the refrigerated space, and may be positioned at any convenient location, for example by attaching it to wall 127 by means of a bracket 173.

Bulbs 170 and 57a, tubes 171 and 92a, and the volume within switching device 70 beneath diaphragm 74 are all in fluid communication with another, to define a two sensing bulb system. If the system is charged with the proper amount of refrigerant as is generally known in the prior art, the warmer of the two bulbs is saturated, never the colder of the two, never the interconnecting capillary and never the control bellows or diaphragm chamber.

The pressure in the two bulb system as applied to diaphram 74, will be the saturation pressure of the warmer of the two bulbs.

In practice, spring 77 may be selected to provide a spring force which adds the force equivalent of about 5 PSI to the pressure from the two bulb system. The system in FIG. 8 will then control the pressure in liquid line 25 so as to maintain it at greater than (1) the equivalent saturation pressure of the refrigerated space temperature plus about 5 PSI, or (2) the equivalent saturation pressure of the liquid line temperature at the entrance of the refrigerated space plus about 5 PSI, whichever is greater.

Because the evaporator operates at a temperature below the refrigerated space temperature, its internal pressure is lower than the equivalent saturation pressure for the internal space temperature. For example, assuming a 10° F. difference in temperature between the evaporator and the refrigerated space, the space may be at 35° F., and the evaporating temperature at 25° F. Assuming, for example, that refrigerant R-12 is used, these temperatures would correspond to a saturation pressure of 32.6 PSI for the space temperature, and the saturation pressure of 24.6 PSI for the evaporating temperature, giving a pressure difference of 8 PSI. This 8 PSI plus 5 PSI (equivalent pressure supplied by bias spring 77) equals 13 PSI minimum pressure differential to which the system will control. This pressure differential corresponds to the pressure drop through the TEV itself, through distributor 26 and evaporator 15. It has been found that by using a wide balanced port TEV and by minimizing the pressure drop through the distributor and evaporator, the actual pressure difference produced across the TEV port by this method will assure proper TEV functioning.

When bulb 57a is the warmer bulb, the same control will control for a minimum subcooling corresponding to 5 PSI above the saturation pressure of the liquid line temperature.

The following discussion considers the operation of the two bulb embodiment of FIG. 8 in each of the temperature examples previously discussed with respect to FIG. 7. In the case of summertime operation, because the liquid in line 25 passes through progressively cooler spaces, subcooling will continue to increase all the way to the TEV. Differential pressure switching device 70 will remain open and the head pressure will "float" normally. In this case, it does not matter where the warmest point is.

In the case of spring or fall temperatures of about 50° the liquid will reach wall 127 of the refrigerated space at some temperature between approximately 55° F. and 70° F. since it will reach about five degrees above ambient in the subcooler, and since it will not exceed the comfort conditioning space temperature. Bulb 57a attached to the liquid line will be the warmer of the two bulbs, and the system will control for a minimum of 5 PSI of subcooling. The pressure drop cross the TEV port will always exceed the minimum requirement without having to be directly controlled.

In the case of wintertime outdoor temperatures, the liquid in line 25 can reach the refrigerated space wall 127 either colder or warmer than the refrigerated space temperature. If it is warmer than the refrigerated space temperature, subcooling will be controlled by bulb 57a as in the case of the spring or fall example. If the liquid reaching the refrigerated space is colder than the refrigerated space, the air temperature sensing bulb 170 in the refrigerated space will be warmer and "in control" of the two bulb system. The liquid line pressure will then be controlled to provide the required pressure difference across the TEV port, and the subcooling will automatically be maintained above 5 PSI without any need for direct control.

Summarizing, the two bulb control of FIG. 8 is able to respond to both low subcooling and low pressure differential, controlling whichever has the greater need. On those occasions when the liquid line temperature sensing bulb 57a is located where the liquid line temperature is not the highest, a proper response is made anyway. In summer, the control will not attempt to boost condensing pressure. In fall or spring, the temperature sensing bulb will be in the warmest point on the liquid line, and subcooling will be optimally controlled thereby. In those wintertime conditions wherein the liquid line can continue to gain heat as it passes through the refrigerated space, the limiting temperature the liquid can achieve will be the space temperature. In this case, bulb 170 in the refrigerated space air will be "in control," and at least in equivalent 5 PSI subcooling will be provided. At the same time, a minimum differential pressure across the TEV, the distributor and the evaporator will be maintained equal to the difference in saturation pressure between the refrigerated space temperature and the evaporator temperature plus the 5 PSI bias.

Other variations on the two bulb control system are possible. One alternative would be to place bulb 170 in thermal contact with vapor line 27, which has a known thermal relationship with evaporator temperature. Another alternative would be to charge switch device 70 (FIGS. 3 and 6) so that either the bulb or the cavity under diaphragm 74 can "control" depending on which is warmer. In this case, the cavity under diaphragm 74 replaces bulb 170 in FIG. 8, and must be located in the refrigerated space or be in contact with some thermal zone having a known temperature relationship to the suction saturation temperature, such as the suction line or evaporator. The functioning of a bulb and diaphragm cavity device charged to control from the warmer is similar to the functioning of the two bulb control device.

We claim:
1. A control system for a refrigeration system of the type including a compressor, a condenser, an expansion device, an evaporator, and interconnection means connected to form a refrigerant flow path therethrough including a liquid line connected between the condenser and the expansion device, said control system comprising means for sensing the subcooling of liquid refrigerant in the liquid line at the warmest point thereof that will assure subcooling at the expansion device, and control means connected to said subcooling sensing means and connected for controlling system head pressure in response to the sensed subcooling.

2. Apparatus according to claim 1 further including means for sensing the pressure differential across said expansion device, and means connecting said pressure differential sensing means to said control means, and wherein said control means are further operable to control system head pressure to maintain at least a predetermined minimum pressure differential.

3. Apparatus according to claim 2 further including a first force balance device connected to said subcooling sensing means, a second force balance device connected to said differential pressure sensing means, and means connecting said first and second force balance devices to said control valve whereby either said subcooling sensing means or said differential pressure sensing means may operate said control means.

4. Apparatus according to claim 3 wherein said means connecting said first and second force balance devices to said control means includes a heat motor and an electrical energization circuit therefor.

5. Apparatus according to claim 2 wherein said means for sensing subcooling and said means for sensing pressure differential comprise a two bulb sensing system, with one bulb in thermal contact with said liquid line and the other bulb in thermal contact with refrigerated air in the space refrigerated by said evaporator.

6. A control system for a refrigeration system of the type including a compressor, a condenser, an expansion device, an evaporator, and interconnection means connected to form a refrigerant flow path therethrough including a liquid line connected between the condenser and the expansion device, said control system comprising means for sensing the subcooling of liquid refrigerant in the liquid line at a point that will assure subcooling at the expansion device, and control means connected to said subcooling sensing means and including means for controlling condenser flooding so as to control system head pressure in response to sensed subcooling.

7. Apparatus according to claim 6 wherein said control means includes a control valve connected from the output of the condenser and a bypass conduit connected from the compressor to the control valve, said control valve operable in response to said subcooling sensing means.

8. Apparatus according to claim 7 wherein said subcooling sensing means includes a refrigerant filled sensing bulb in thermal contact with said liquid line and a pressure tap in said liquid line, and wherein said control valve includes a diaphragm for actuation thereof, and means for connecting said sensing bulb and said pressure tap to said control valve for operation of said diaphragm.

9. Apparatus according to claim 8 wherein said sensing bulb includes a quantity of non-condensable gas to provide a bias for said control system.

10. Apparatus according to claim 7 wherein said subcooling sensing means include a fluid pressure tap in said liquid line and a refrigerant filled sensing bulb in thermal contact with said liquid line, and further including a force balance device and means for connecting said pressure tap and said sensing bulb to said force balancing device in opposition to each other, and means connecting said force balance device to said control valve for operation thereof.

11. Apparatus according to claim 10 wherein said means connecting said force balance device to said control valve includes a heat motor, and an electrical energization circuit therefor.

12. A control system for a refrigeration system of the type including a compressor, a condenser, a receiver, an expansion device, an evaporator and interconnection means connected to form a refrigerant flow path therethrough including a liquid line connected to conduct liquid refrigerant to the expansion device, said control system comprising subcooling sensing means including a refrigerant filled sensing bulb in thermal contact with said liquid line at a point that assures subcooling at the expansion device and a pressure tap in communication with the pressure in said liquid line, a control valve connected to said receiver and said condenser and operable for controlling condenser flooding so as to control system head pressure, said control valve including a diaphragm for actuation thereof, and means for connecting said sensing bulb and said pressure tap to said control valve for operation of the diaphragm thereof, whereby to control system pressure to maintain subcooling at the expansion device.

13. A control system according to claim 12 wherein said control valve is connected to the output of the condenser, and including a bypass conduit connected from the compressor to the control valve, and including a subcooler connected in said liquid line downstream of said receiver.

14. A control system according to claim 12 wherein said condenser and said receiver are connected in parallel to receive the output of said compressor, and the outputs of the receiver and the condenser are connected to said control valve.

15. A control system according to claim 12 wherein said sensing bulb includes a quantity of non-condensable gas to provide a bias for said control system.

16. A control system for a refrigeration system of the type including a compressor, a condenser, a receiver, an expansion device, an evaporator, and interconnection means connected to form a refrigerant flow path therethrough including a liquid line connected to conduct liquid refrigerant to the expansion device, said control system comprising a control valve connected to control condenser flooding so as to control system head pressure, and subcooling sensing means including a fluid pressure tap in said liquid line and a refrigerant filled sensing bulb in thermal contact with said liquid line at a point that assures subcooling at the expansion device, a force balance device, means for connecting said pressure tap and said sensing bulb to said force balance device in opposition to each other, and means connecting said force balance device to said control valve for controlling the operation thereof.

17. A control system according to claim 16 wherein said control valve is connected to receive the output of the condenser, and including a bypass conduit connected from the compressor to the control valve, and including a subcooler connected in said liquid line downstream of said receiver.

18. A control system according to claim 16 wherein said receiver and condenser are connected in parallel to receive the output from said compressor, and wherein the outputs of the receiver and condenser are connected to said control valve.

19. A control system according to claim 16 wherein said control valve includes an actuating diaphragm therefor, and wherein said means connecting said force balance device to said control valve includes a heat motor having a fluid circuit connected for operating said diaphragm, and an electrical energization circuit operated by said force balancing device and connected to energize said heat motor.

20. A control system for a refrigeration system of the type including a compressor, a condenser, a control valve connected to receive the output of the condenser, a bypass conduit connecting from the compressor to the control valve, a receiver, a subcooler, an expansion valve, an evaporator, and interconnection means connected to form a refrigerant flow path therethrough including a liquid line connected to carry liquid refrigerant to the expansion device, said control system comprising:

subcooling sensing means including a fluid pressure tap in said liquid line and a refrigerant filled sensing bulb in thermal contact with said liquid line at a point thereon that will assure subcooling at the expansion device;

a pair of force balance devices;

means for connecting said pressure tap and said sensing bulb to one of said force balance devices in opposition to each other;

means including pressure taps connected for applying the pressures on either side of the expansion valve to said second force balance device;

a heat motor connected to control said control valve; and an electrical energization circuit connecting from said first and second force balance devices to said heat motor, whereby either a minimum sensed subcooling condition or a minimum sensed pressure differential condition will control said control valve to raise system head pressure.

21. A control system for a refrigeration system of the type including a compressor, a condenser, a control valve connected to receive the output of the condenser, a bypass conduit connecting from the compressor to the control valve, a receiver, a subcooler, an expansion valve, an evaporator, and interconnection means connected to form a refrigerant flow path therethrough including a liquid line connected to carry liquid refrigerant to the expansion device, said control system comprising:

a two-bulb sensing system having a first bulb in thermal contact with said liquid line near the entrance of the liquid line into the space refrigerated by said evaporator, and a second bulb positioned to have a known thermal relationship to the evaporator;

a force balance device and means for applying pressure in said two-bulb system, and the pressure in said liquid line thereto in opposition to each other; and means operatively connecting said force balance device to said control valve for controlling system head pressure.

22. A control system according to claim 21 wherein said means operatively connecting said force balance device and said control valve includes a heat motor and an electrical energization circuit therefor actuated by said force balance device.

23. A control system according to claim 21 wherein said force balance device includes a bias spring.

* * * * *